United States Patent
Piqueras Jover et al.

(10) Patent No.: US 9,860,067 B2
(45) Date of Patent: Jan. 2, 2018

(54) CRYPTOGRAPHICALLY SIGNING AN ACCESS POINT DEVICE BROADCAST MESSAGE

(71) Applicant: AT&T INTELLECTUAL PROPERTY I, L.P., Atlanta, GA (US)

(72) Inventors: Roger Piqueras Jover, New York, NY (US); Gustavo de los Reyes, Fair Haven, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 102 days.

(21) Appl. No.: 14/926,568

(22) Filed: Oct. 29, 2015

(65) Prior Publication Data
US 2017/0126411 A1    May 4, 2017

(51) Int. Cl.
| | |
|---|---|
| *H04L 9/32* | (2006.01) |
| *H04W 72/00* | (2009.01) |
| *H04W 12/04* | (2009.01) |
| *H04W 84/04* | (2009.01) |
| *H04W 88/02* | (2009.01) |
| *H04W 88/08* | (2009.01) |

(52) U.S. Cl.
CPC .......... *H04L 9/3247* (2013.01); *H04W 12/04* (2013.01); *H04W 72/005* (2013.01); *H04L 2209/24* (2013.01); *H04L 2209/72* (2013.01); *H04W 84/042* (2013.01); *H04W 88/02* (2013.01); *H04W 88/08* (2013.01)

(58) Field of Classification Search
CPC .............. H04L 9/3247; H04L 2209/24; H04L 2209/72; H04W 12/04; H04W 72/005; H04W 84/042; H04W 88/02; H04W 88/08

USPC ......................................................... 713/176
See application file for complete search history.

(56) References Cited

U.S. PATENT DOCUMENTS

| 7,916,705 B2 | 3/2011 | Olson et al. |
| 7,962,958 B2 | 6/2011 | Robert et al. |
| (Continued) | | |

OTHER PUBLICATIONS

Ma, et al. "A Hybrid Rogue Access Point Protection Framework for Commodity Wi-Fi Networks." INFOCOM 2008. The 27th Conference on Computer Communications. IEEE. IEEE, 2008, 9 pages.
(Continued)

*Primary Examiner* — Kambiz Zand
*Assistant Examiner* — Benjamin Kaplan
(74) *Attorney, Agent, or Firm* — Amin, Turocy & Watson, LLP

(57) ABSTRACT

An access point device that broadcasts a signal including a publicly known PLMN code is conventionally assumed by user equipment devices to be a legitimate access point device deployed by the communication provider associated with that PLMN. User equipment devices associated with that provider may attempt to attach to that access point device, even if the access point device is in reality a rogue access point device. During this exchange of information, the rogue access point device can compromise the user equipment device in numerous ways and can do so despite strong encryption/authentication associated with modern LTE standards. Architectures are disclosed that provide cryptographically signed information in a broadcast message so an access point can be authenticated before selection, attempting to attach, accepting instructions, and/or transmitting any information to the access point device.

20 Claims, 10 Drawing Sheets

(56) References Cited

U.S. PATENT DOCUMENTS

| | | |
|---|---|---|
| 8,000,698 B2 | 8/2011 | Wolman et al. |
| 8,089,974 B2 | 1/2012 | Calhoun et al. |
| 8,176,328 B2 | 5/2012 | Chen et al. |
| 8,295,255 B2 | 10/2012 | Nakano |
| 8,893,246 B2 | 11/2014 | Jover Segura et al. |
| 2005/0041634 A1* | 2/2005 | Aura .................. H04L 41/12 370/351 |
| 2007/0186276 A1 | 8/2007 | McRae et al. |
| 2007/0189528 A1 | 8/2007 | Ueda |
| 2008/0301773 A1 | 12/2008 | Achtari et al. |
| 2010/0106966 A1 | 4/2010 | Santos et al. |
| 2012/0290870 A1* | 11/2012 | Shah .................. G06F 21/10 714/4.11 |
| 2014/0337633 A1 | 11/2014 | Yang et al. |
| 2015/0082429 A1 | 3/2015 | Rangarajan et al. |
| 2015/0139211 A1 | 5/2015 | Ji |
| 2016/0286395 A1* | 9/2016 | Adrangi ............... H04W 12/06 |
| 2016/0373260 A1* | 12/2016 | Jerkeby ............... H04L 9/3263 |

OTHER PUBLICATIONS

Srilasak, et al. "Integrated Wireless Rogue Access Point Detection and Counterattack System." Information Security and Assurance, 2008. ISA 2008. International Conference on. IEEE, 2008, 6 pages.

\* cited by examiner

FIG. 4

CRYPTOGRAPHICALLY SIGNING AN ACCESS POINT DEVICE BROADCAST MESSAGE

TECHNICAL FIELD

The present application relates generally to the field of mobile communication and more specifically to utilizing cryptographic techniques in connection with an access point broadcast message to, e.g., mitigate potential threats from rogue base stations that seek to imitate legitimate base stations.

BACKGROUND

In mobile communication networks today, mobile devices or other user equipment (UE) connect to the network by attaching to a particular base station or other access point. Typically, access point devices periodically transmit a broadcast message that includes a public land mobile network (PLMN) identifier that identifies a particular provider network as well as certain communication, operational, and other parameters. UE devices that receive this broadcast message can verify whether the PLMN identifier matches its own associated network and, if so, select the access point device in order to connect to the mobile network. Upon selection of a particular access point device, the UE and the access point device engage in a handshaking procedure and exchange numerous messages.

Since the PLMN identifier is public knowledge and further many of the parameters can be discovered via eavesdropping/sniffing techniques, rouge base stations are able to transmit a broadcast message that appears to the UE to be legitimate. Thus, the UE may attach to the rogue base station instead of a legitimate base station. Once attached to the rogue base station, the UE is exposed to numerous threats and both the UE and the legitimate mobile network carrier can suffer undesirable consequences.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which:

FIG. 4 depicts an illustration of an example LTE message exchange between an access point device and a user equipment device before and after mutual authentication in accordance with certain embodiments of this disclosure;

DETAILED DESCRIPTION

Overview

Figure 1:
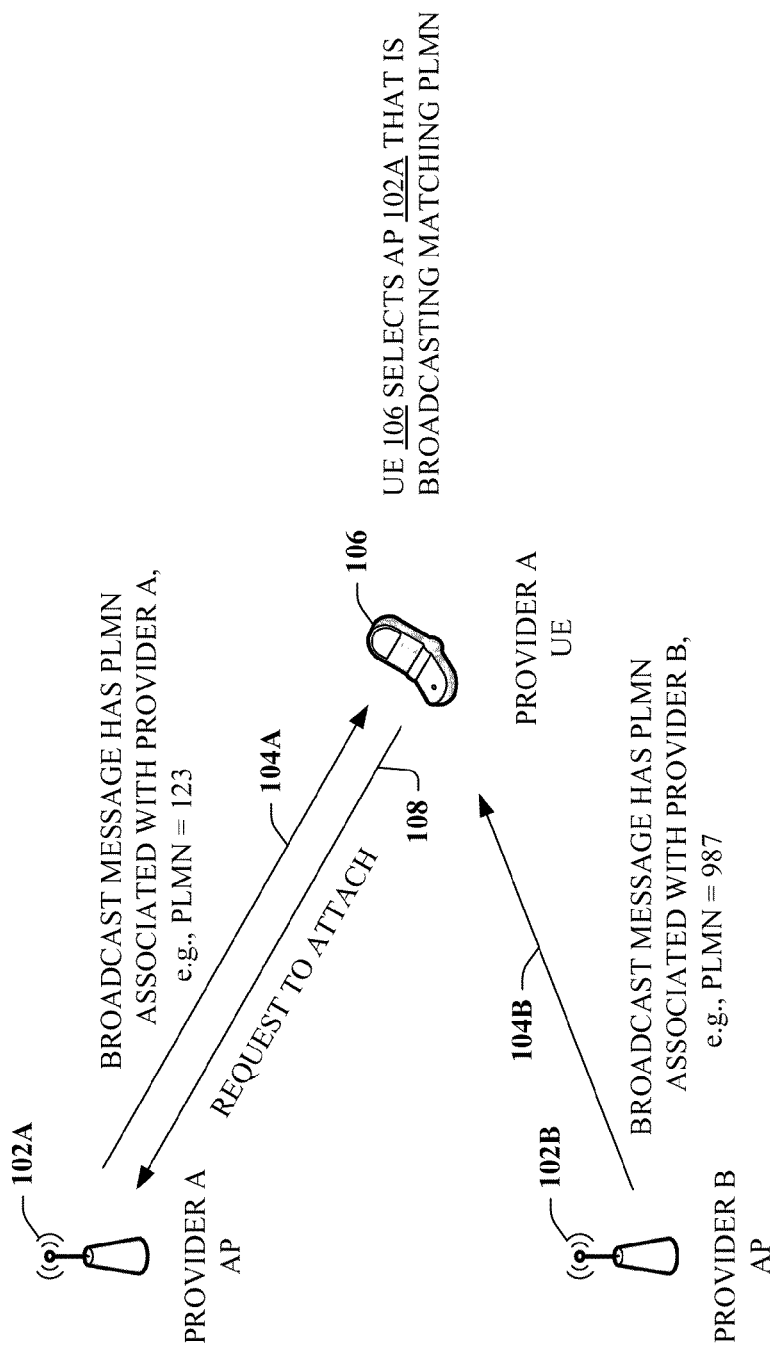
FIG. 1 illustrates a block diagram of an example communication environment depicting various broadcast messages that are broadcast by access point devices of communication network providers in accordance with certain embodiments of this disclosure.

Rogue base stations represent a significant threat that affects virtually all mobile network providers. The impact and prevalence of rogue base stations is rapidly increasing, resulting in several news stories on related threats. By leveraging a rogue base station, an adversary, foreign government agency or law enforcement agency can locally eavesdrop on mobile phone communications as well as track and find the location of mobile phones. Such can occur without the knowledge of the mobile phone operator and network provider and represents a threat not only to mobile users, but can have a big negative impact on the network provider in terms of publicity and customer goodwill.

In parallel, rogue base stations can also be designed to exploit multiple mobile network protocol vulnerabilities, resulting in degraded or blocked service for mobile users, privacy leaks, and so forth. For example, in the case of legacy second generation partnership (2G) global system for mobile communication (GSM) networks, the lack of mutual authentication makes it possible for an attacker to deploy a rogue base station that fools mobile devices (e.g., UEs) to connect to the rogue base station as if it were a legitimate base station maintained by the network provider. Such allows the attacker controlling the rogue base station to intercept all traffic communications, impersonate anyone on incoming calls and text messages, deploy malware on the UE and even steal credentials.

Apart from legacy 2G systems, modern mobile technologies, such as long term evolution (LTE), implement a mutual authentication scheme and a strong encryption algorithm. Rogue base stations typically cannot pass the mutual authentication. Nevertheless, mutual authentication can only occur after the threatened UE is fooled into selecting the rogue base station and after the threatened UE is fooled into attempting to attach to the rogue base station, which involves the exchange of numerous messages. Hence, an attacker can still successfully impersonate a legitimate base station for a significant time window while messages are transmitted in the clear before mutual authentication occurs.

This time window is sufficient for the attacker to pretend to be a legitimate base station and force the UE to, for example, transmit its international mobile subscriber identity (IMSI) in the clear (IMSI catcher or stingray functionality). Other threats possible in LTE include potentially locking the subscriber identity module (SIM) card and fooling the phone to downgrade to GSM (where no authentication is performed) and connect to a second rogue base station controlled by the attacker. Once on this GSM rogue base station, the UE is exposed to all the aforementioned threats.

Accordingly, even with mutual authentication and strong encryption provided by LTE standards, LTE and other mobile communication systems are susceptible to rogue base station threats. One reason for these threats is that a UE attempts to communicate with anything that "looks" like a legitimate base station of the provider that issued the UE's SIM card. It is not until the UE attempts to authenticate the base station that the UE can determine whether the access point is a legitimate access point. In the case of LTE standards, by the time the authentication occurs, it can be too late to thwart the rogue attack. In the case of GSM, the lack of mutual authentication prevents the UE from being able to determine the legitimacy of the base station at all.

As a result, there is a need to devise a system that allows UEs to determine the legitimacy of a mobile base station or other access point before exchanging messages with the access point device. The subject matter disclosed herein provides techniques for an access point device to transmit a broadcast message with a cryptographic signature. Upon receipt of the broadcast signal, a UE device can determine the legitimacy of the access point device before selecting the access point device or attempting to attach to the access point device or transmitting any messages to the access point device.

In other systems today, there is no known technique to allow a UE to distinguish between a rogue base station and a legitimate one at the outset. Conventionally, any GSM, 3G or LTE access point transmitting the right broadcast signals (which are known publicly and well defined by the standards) and identifying itself with the proper PLMN code is treated as a legitimate base station. In the case of 2G, the UE does not authenticate at all whether the access point is a real or rogue base station and, in the case of LTE, although a rogue base station is incapable of passing the mutual authentication step, there is still room for the threats described previously.

This disclosure presents techniques to allow a UE to determine whether a base station is legitimate or not before initiating any attempt to attach or transmitting any type of communication. For example, in the case of LTE, instead of blindly initiating a handshake with any base station with the proper PLMN code (and not being able to check whether the broadcast signal originates from a rogue base station until the mutual authentication step), the UE is able to decide whether to attempt connection based on the broadcast messages the base station transmits.

Techniques herein introduced do not require modification of the standards and can be implemented by simply adding an extra field to the broadcast messages that base stations transmit periodically in every frame.

In general, the proposed solutions can potentially combine two enhancements: a digital signature to identify legitimate base stations and an added portion to ensure "freshness" of the signature and avoid replay attacks. The freshness indicator can be included within the digital signature to ensure that the freshness element was indeed added by a legitimate base station.

For instance, based on a public-private key scheme, every UE knows a priori the public key of the mobile operator. In parallel, legitimate base stations transmit a message (e.g., nonce N) encrypted or signed by the mobile operator's secret key. Thus, decoding the right nonce with the public key implies that it must have been transmitted from a legitimate base station.

Based on any standard and strong hash function, an extra message can be derived hashing a time stamp and a number of parameters from the legitimate base station's configuration. The UE can independently decode these parameters from the master information block (MIB) and/or system information block(s) (SIB) of the typical broadcast messages. Such can provide a way to verify the "freshness" of the messages and substantially increase the difficulty of deploying a rogue base station.

In order to combine both the signature for authenticity and the hash for "freshness", the original nonce N (unencrypted) can also be added to the hash. The same functionality can be obtained by combining any standard digital signature scheme with any method to prevent replay of messages or sessions.

Example Systems

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, communication environment 100 is depicted illustrating various broadcast messages that are broadcast by access point devices of communication network providers. In this example, two access point devices (e.g., base stations, nodeBs, evolved nodeBs, etc.), 102A (associated with provider A) and 102B (associated with provider B), are depicted. In communication systems today, access point devices (e.g., 102A and 102B) advertise themselves to subscriber devices by transmitting a broadcast message (e.g., 104A and 104B) at periodic intervals. Different portions of the broadcast message can be transmitted at different intervals and on different channels, which is further detailed in connection with FIG. 2.

It is common for a user equipment device to receive many such broadcast signals, not only from different access points deployed by the user equipment's network provider, but from access points (APs) of other competitor networks as well. As illustrated here, UE 106 receives (e.g., is in range of) broadcast signal 104A from AP 102A deployed by the network provider and broadcast signal 104B from AP 102B deployed by a different network provider. Although different providers are allocated different spectrum, to avoid interference, overlap, or confusion, broadcast messages (e.g., 102A and 102B) also typically include a PLMN code that identifies the network provider to UE 106.

In this example, UE 106 is associated with provider A, and since broadcast message 104A includes the PLMN code "123" associated with provider A, UE 106 can determine that AP 102A has been deployed by provider A. On the other hand, since broadcast message 104B includes the PLMN code "987" associated with provider B, UE 106 can determine that AP 102B has been deployed by a different provider. Based on the above, UE 106 will not select or attempt to attach to AP 102B, but may select or attempt to attach to AP 102A. If UE 106 does select AP 102A, then UE 106 can transmit message(s) 108 to AP 102A requesting to attach.

As demonstrated in this example, broadcast messages transmitted by access point devices provide a mechanism for UE devices to identify appropriate AP devices in order to attach to a host network. Such broadcast messages (e.g., 104A and 104B) are generally defined by standards bodies such as 2G, 3G, or LTE.

Figure 2:
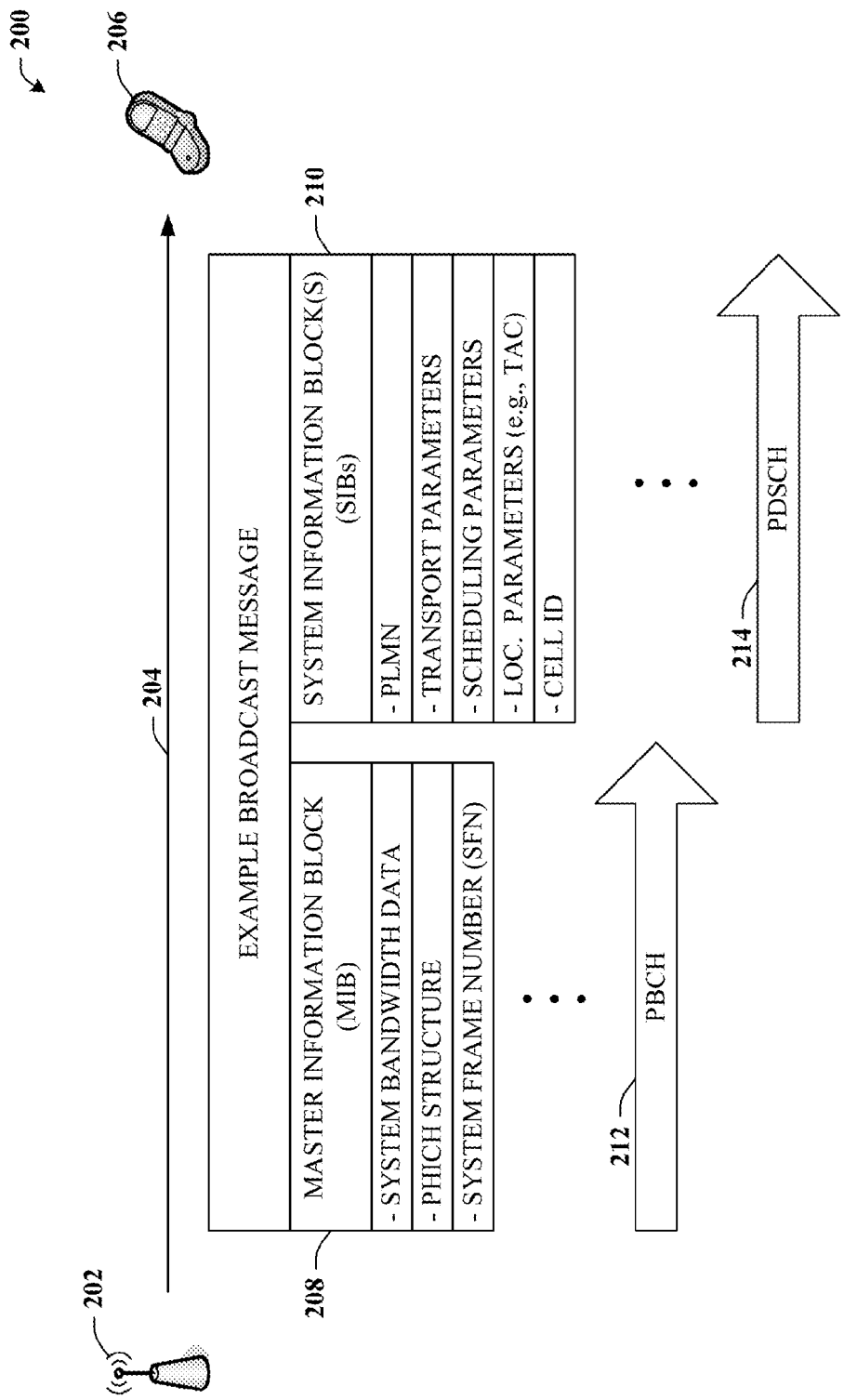
FIG. 2 illustrates a block diagram of an example that example that illustrates an example broadcast message in accordance with LTE in accordance with certain embodiments of this disclosure.

FIG. 2 provides example 200 that illustrates an example broadcast message in accordance with LTE. Here, AP 202 transmits broadcast message 204, which is received by UE 206. Broadcast message 204 can include a master information block (MIB) 208 and one or more system information blocks (SIBs) 210. MIB 208 can include the most frequently transmitted parameters that are essential for an initial access to the network. For example, MIB 208 can include data relating to system bandwidth, physical hybrid ARQ indicator channel (PHICH) structure, and all or a portion of the system frame number (SFN), which identifies a time frame associated with the message. Generally, MIB 208 is broadcast over a physical broadcast channel (PBCH) 212 at very frequent intervals (e.g., every 10 ms).

The remainder of system configuration information used by UE to connect to the network is encoded in SIBs 210, which is modulated on the physical downlink shared channel (PDSCH) 214. These messages can be mapped on the PDSCH based on broadcast ID, the system information RAN temporary identifier (SI-RNTI), which is fixed in the specifications and therefore known a priori to all UEs (and potential attackers). SIB 210 is separated into numerous sub-portions, such as SIB-1, SIB-2, SIB-3, etc., each with different parameters as defined by public specifications promulgated by standards bodies. For example, The SIB-1 message (e.g., a portion of SIB 210) can contain the PLMN, transport parameters necessary to connect to the cell as well as scheduling information, scheduling parameters, location parameters (e.g., tracking area code), cell ID, and so forth. The SIB-2 message can contain information on all common and shared channels. Subsequent SIB messages (e.g., SIB-3 and so on) define multiple parameters, such as the power thresholds for cell re-selection and the list of neighboring cells. SIB 210 messages are generally broadcast at intervals that are increasingly less frequent than the interval for MIB 208. For example, SIB-1 may be broadcast every 80 ms, SIB-2 may be broadcast every 160 ms, and so on.

Figure 3:
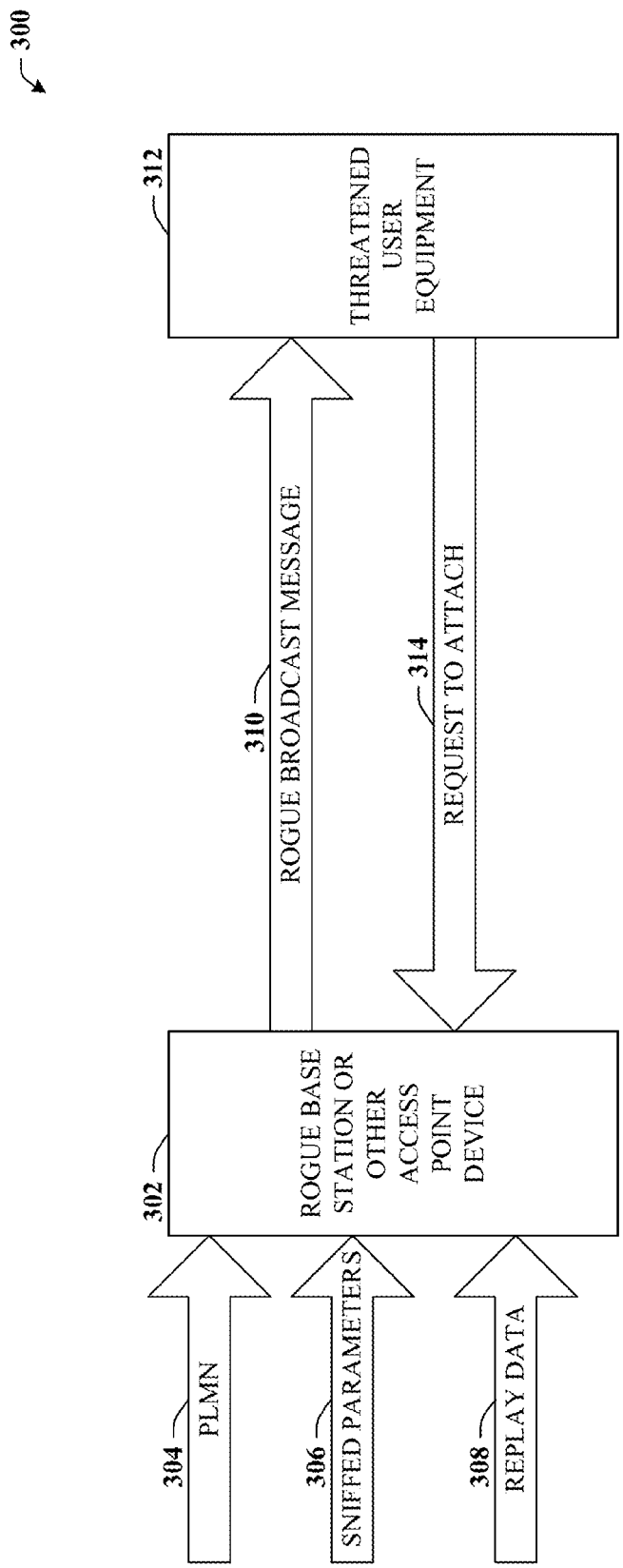
FIG. 3 illustrates a block diagram of an example system that illustrates a user equipment device that receives a rogue broadcast message from a rogue access point device and attempts to attach to the rogue access point device in accordance with certain embodiments of this disclosure.

Turning now to FIG. 3, system 300 is provided. System 300 illustrates a user equipment device that receives a rogue broadcast message from a rogue access point device and attempts to attach to the rogue access point device. It is understood that because UE 312 attempts to attach to rogue AP 302, UE 312 is exposed to numerous security threats. However, in conventional systems, UE 312 will very likely respond to rogue broadcast message 310 with request 314. One reason for this is that rogue broadcast message 310 can be similar enough or even identical to a legitimate broadcast message (e.g., broadcast message 104A or 204).

Such is the case because the PLMN (e.g., PLMN 304) of a legitimate provider is publicly known, as is the structure of a legitimate broadcast message defined by standards. Hence, rogue access point device 302 need only populate rogue broadcast message 310 with data that is similar to or identical to that of a legitimate base station, which is typically done in one of two ways. The first of these two ways is referred to herein as an imitation attack and the second is referred to as a replay attack.

To initiate an imitation attack, the attacker can discover sniffed parameters 306 by listening to a target legitimate AP. Recall, the legitimate AP advertises this information in the clear so that subscriber UEs can determine whether or not to connect to the legitimate AP. Hence, the attacker can "sniff" these parameters and provide them to rogue AP 302 in original form or modified slightly for the attacker's purposes.

To initiate a replay attack, the attacker can simple collect the broadcast message from a target legitimate AP and provide such replay data 308 to rogue AP 302. Thereafter, rogue AP 302 merely rebroadcasts that message with parameters that are the same or modified to facilitate the attack.

As noted previously, LTE provides for a mutual authentication procedure that currently cannot be passed by rogue AP 302. However, this authentication occurs after UE 312 has requested to attach to rogue AP 302 and after numerous messages can be exchanged, including instruction from rogue AP 302 that compromise the potential security afforded by the authentication.

Figure 4:
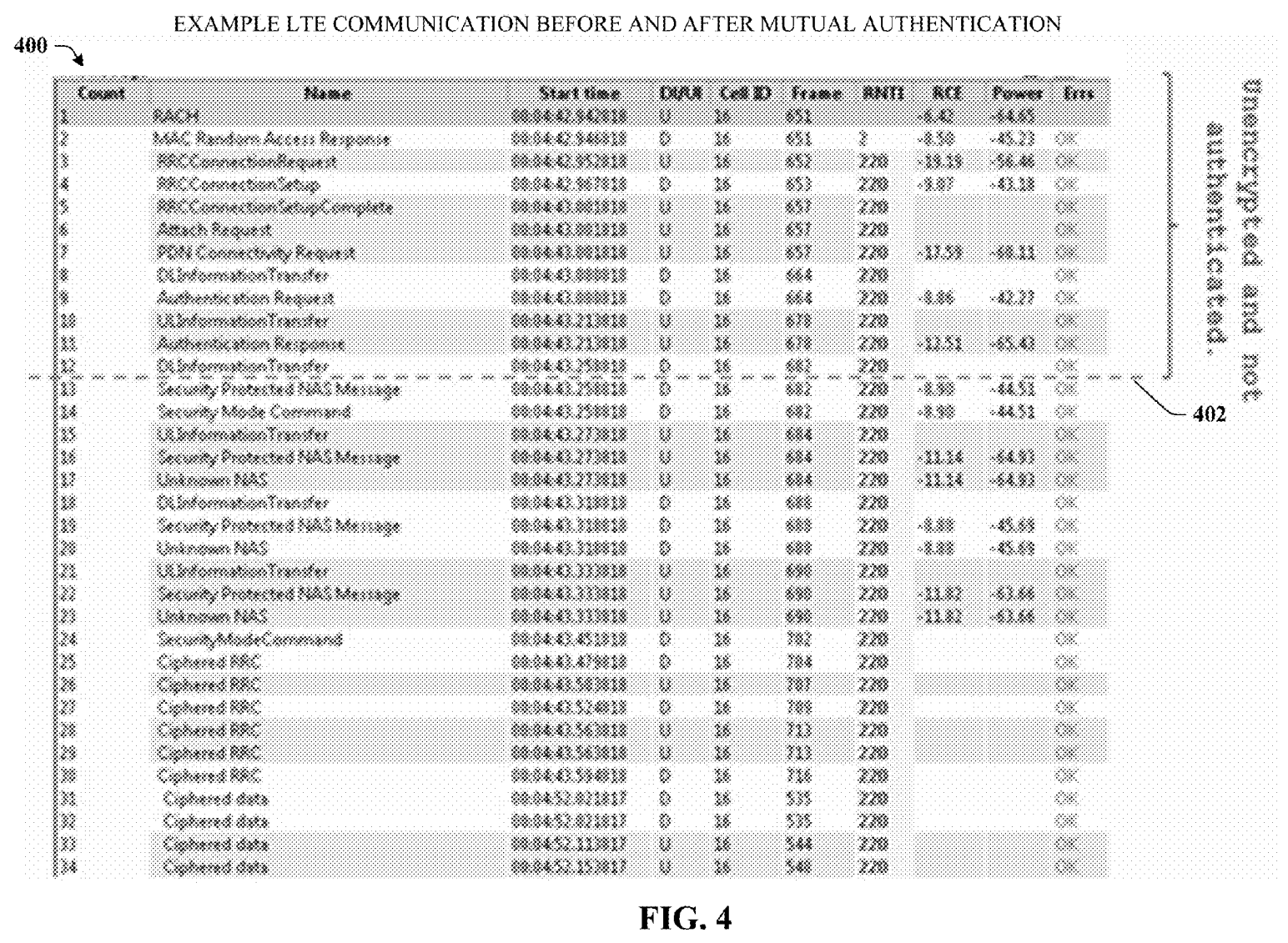

For example, FIG. 4 provides illustration 400 that depicts an example of LTE communication between an access point and a user equipment device before and after mutual authentication. As illustration 400 shows, it is not until after numerous messages have been exchanged (see dashed line 402) before authentication and encryption occurs. Prior to this time, all messages are exchanged in the clear, unencrypted and unauthenticated. An advantage of the disclosed subject matter is that a user equipment device can determine the authenticity of an AP before selecting for attachment or attempting to attach to a given AP. Accordingly, the user equipment device can, upon determining that the AP is not legitimate, refuse to transmit any communication to the AP and even bar the AP. Hence, threats posed by rogue APs can be substantially mitigated.

Figure 5:
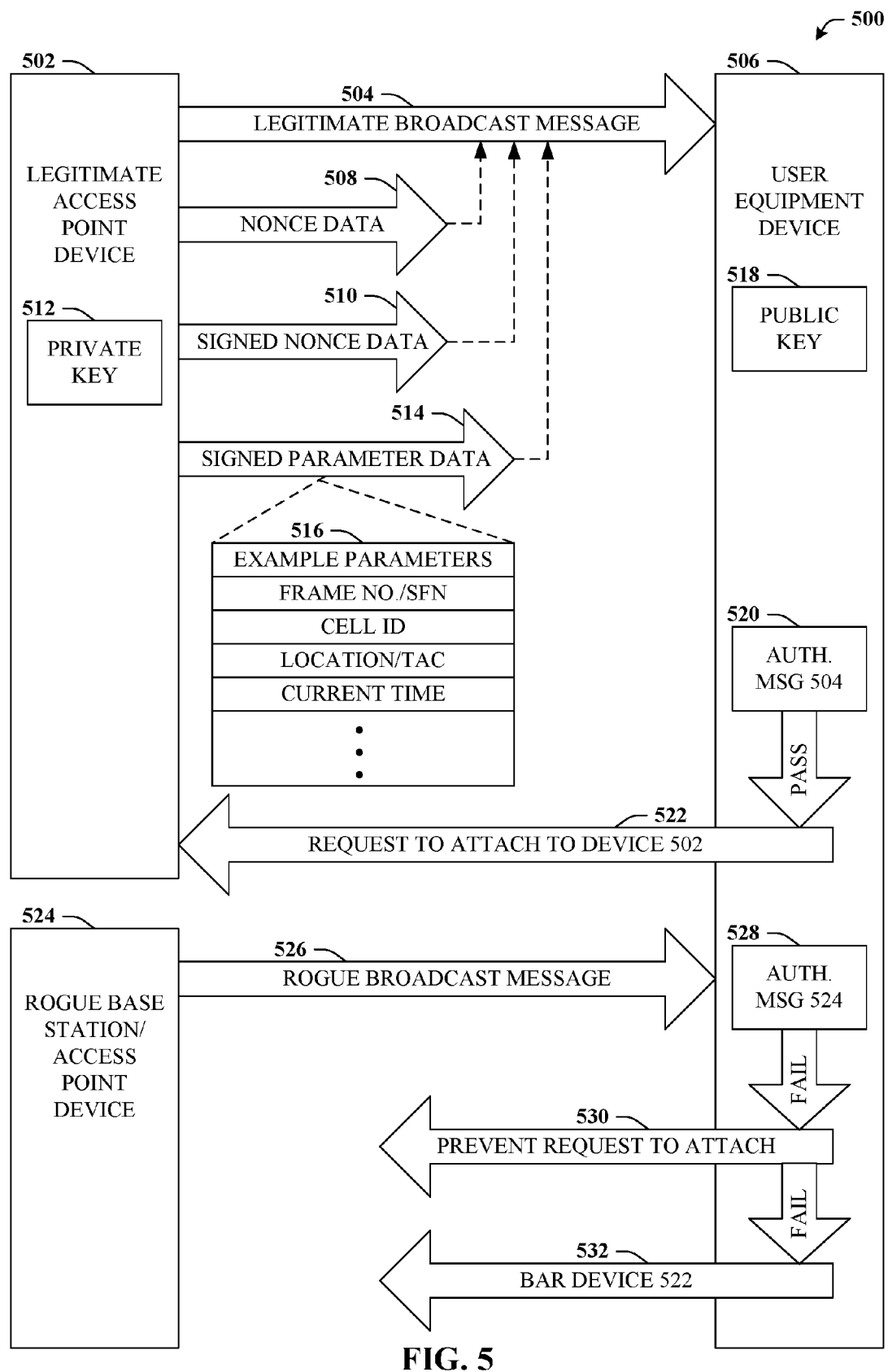
FIG. 5 illustrates a block diagram of an example system that can provide for authentication that can be performed prior to a user equipment device attempting to attach to an access point device, prior to transmitting information to the access point device and/or prior to executing instructions received from the access point device in accordance with certain embodiments of this disclosure.

With reference now to FIG. 5, system 500 is depicted. System 500 can provide for authentication that can be performed prior to a user equipment device attempting to attach to an access point device, prior to transmitting information to the access point device and/or prior to executing instructions received from the access point device. Generally, system 500 can comprise a processor and a memory that stores executable instructions that, when executed by the processor, facilitate performance of operations. Said processor and memory, as well as other suitable computer or computing-based elements, can be used in connection with implementing one or more of the systems or components shown and described in connection with FIG. 5 and other figures disclosed herein.

AP 502 can represent a legitimate AP deployed by a communication network provider entity and can broadcast (legitimate) broadcast message 504, which can be received by a UE device 506 that is in range of the broadcast message 504. In addition, AP 502 can randomly generate cryptographic information referred to herein as "nonce data" 508. Nonce data 508 can be, e.g., randomly generated alphanumeric data. AP 502 can generate signed nonce data 510 representing the nonce data 508 that is cryptographically signed with a cryptographic key such as private key 512 that can be stored at AP 502. Private key 512 can be associated with the provider entity and can represent one of a public-private key pair. In some embodiments, AP 502 can generate encrypted nonce data (not shown). It is understood that signing data with private key 512 can provide authentication (e.g., that said data is from a device associated with the provider entity) but does not necessarily obfuscate the data, whereas encrypting data (e.g., with another key, e.g., a corresponding public key) obfuscates that data, but does not necessarily authenticate the source. Data that is signed or encrypted by a first key of a key pair can be decoded or unencrypted with the corresponding paired key in order to, e.g., authenticate or decrypt. In some embodiments, AP 502 can comprise other keys, including, for example public keys or other private keys.

UE 506 can receive broadcast message 504 (that is advertised by AP 502) that in some embodiments includes nonce data 508 and signed nonce data 510 and authenticate broadcast message 504 using public key 518. Such is depicted at reference numeral 520. Since broadcast message 504 is a legitimate broadcast message from legitimate AP 502, authentication 520 is passed. In response, UE 506 is allowed to select AP 502. Hence, UE 506 can transmit a request 522 to attach to AP 502, engage in handshaking, and so forth.

In contrast, consider rogue AP 524 that transmits rogue broadcast message 526. It is noted that for imitation attacks that rogue AP, which does not have access to private key 512, cannot generate signed nonce data 510. Thus, at authentication 528, rogue broadcast message 526 fails the authentication. In response, UE 506 can take steps to prevent a selection of or a request to attach to rogue AP 524, which is illustrated at reference numeral 530. Additionally or alternatively, UE 506 can bar all communication to or from rogue AP 524 and/or refuse to perform any instructions from rogue AP 524, which is illustrated at reference numeral 532.

Apart from imitation attacks, when considering replay attacks, rogue broadcast message 526 may be identical to (e.g., a re-broadcast of) legitimate broadcast message 504. As a result, the signed nonce data 510 may in fact pass authentication 528 since the re-broadcast data did originate from AP 502, but was intercepted and re-broadcast by rogue AP 524 in a different area or even the same area.

Accordingly, in some embodiments, other authentication can be performed, e.g., in order to thwart or mitigate replay attacks. As one example, AP 502 can generate signed parameter data 514. Signed parameter data 514 can represent a signed version of system information/configuration data that can be used to create a freshness indicator. In this regard, since replay attacks are re-broadcasts of legitimate data, these re-broadcasts typically must be at least one of either later in time than the legitimate broadcast or broadcast at a remote location from the legitimate broadcast.

In either case, legitimate system information parameters 516 associated with AP 502 can allow UE 506 to distinguish rogue versus legitimate broadcast messages. For instance, such parameters 516 can include, e.g., a frame number identifier used in communication between the AP and the UE (e.g., SFN), a cell identifier of the AP, a location of the AP (e.g., tracking area code), a current time stamp, and so forth. Parameter(s) 516 can be data that is normally included in the master information block or system information blocks of broadcast messages. By signing some or all of these parameters 516, the legitimacy of parameters 516 that are received via a given broadcast message can be authenticated similar to the case for nonce data. Moreover, a replay attack cannot modify those parameters or they will not match the signed version. Since a replay attack is essentially forced to have a different frame number, location, and/or current time value than expected from the legitimate AP, including signed parameter data 514 in broadcast message 504 can further mitigate replay attacks. It is understood that using signed parameter data 514 can be utilized in addition to or alternatively to using signed nonce data 508.

Example Methods

Figure 6:
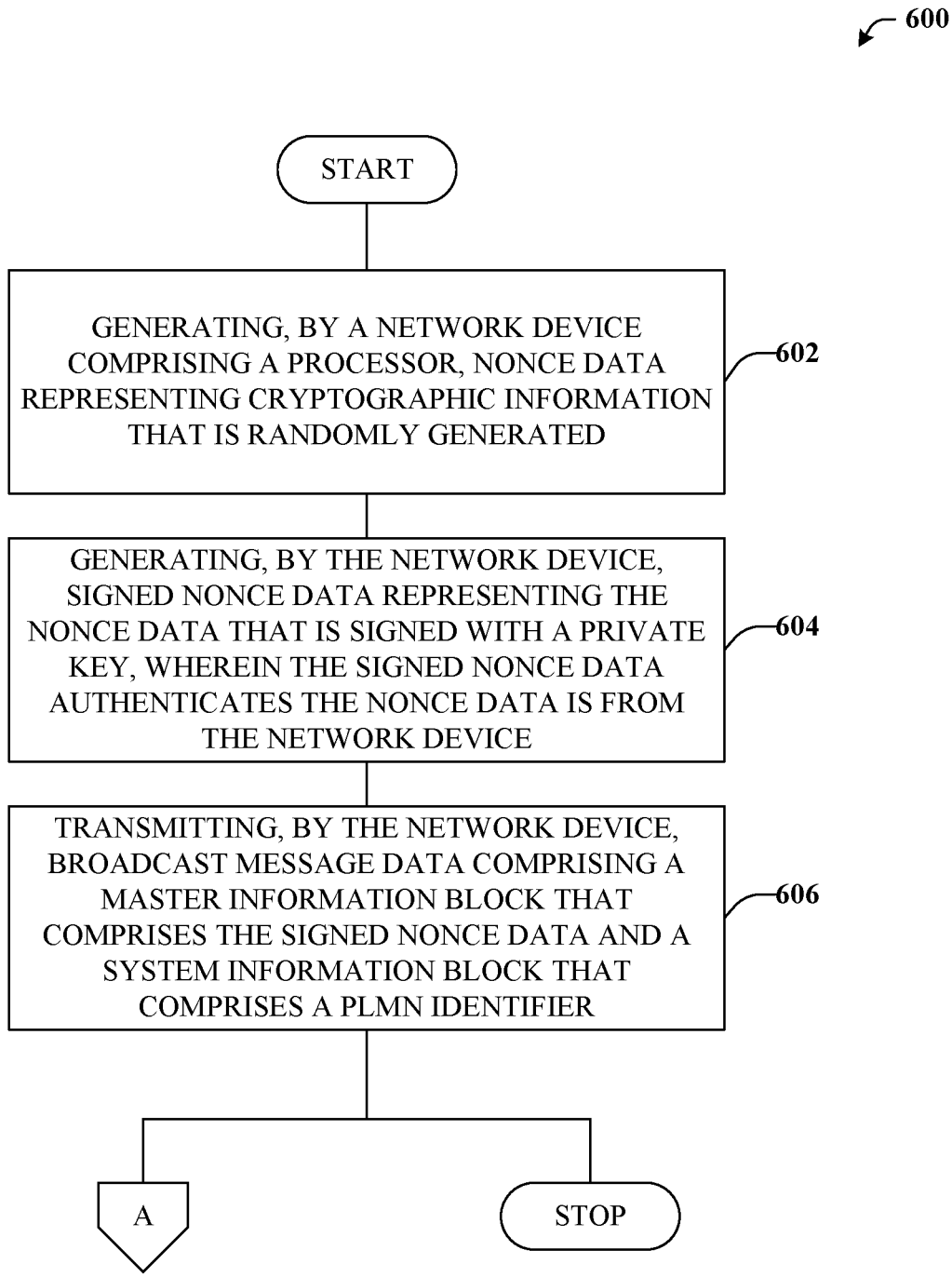
FIG. 6 illustrates an example methodology that can provide for including cryptographically signed data in a broadcast message in accordance with certain embodiments of this disclosure.
Figure 7:
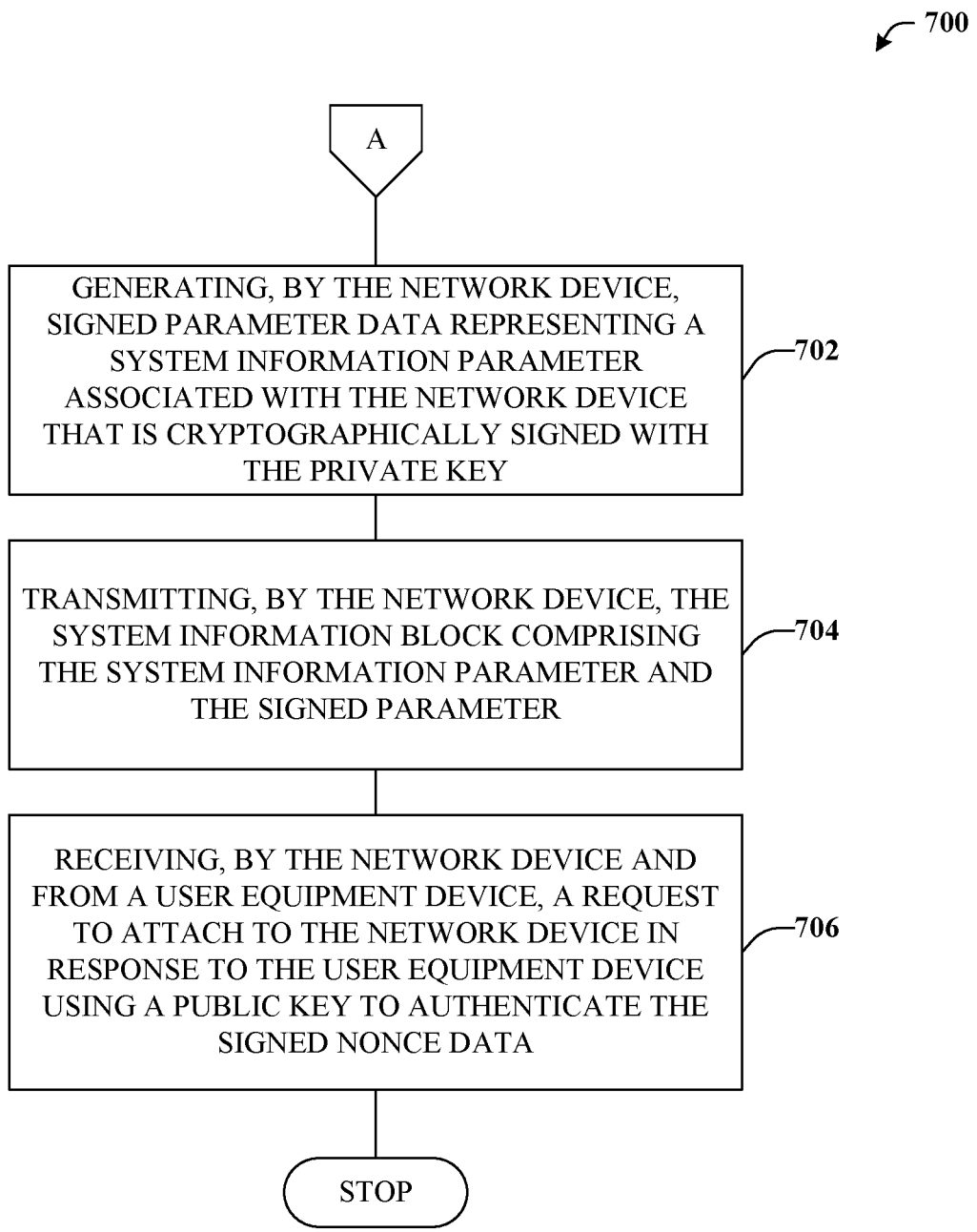
FIG. 7 illustrates an example methodology that can provide for additional elements or aspects in connection with including cryptographically signed data in a broadcast message in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can provide for including cryptographically signed data in a broadcast message. For example, at reference numeral 602, a network device (e.g., an access point device) comprising a processor, can generate nonce data representing cryptographic information that is randomly generated.

At reference numeral 604, the network device can generate signed nonce data representing the nonce data that is cryptographically signed with a private key associated with a communication provider entity. The signed nonce data can be utilized to authenticate the nonce data is from the network device of the communication provider entity.

At reference numeral 606, the network device can transmit broadcast message data. The broadcast message data can comprise a master information block (MIB) that comprises the signed nonce data and a system information block (SIB) that comprises a public land mobile network identifier associated with the communication provider entity. Method 600 can proceed to insert A, which is further detailed in connection with FIG. 7, or end.

With reference now to FIG. 7, exemplary method 700 is illustrated. Method 700 can provide for additional elements or aspects in connection with including cryptographically signed data in a broadcast message. For example, at reference numeral 702, the network device can generate signed parameter data representing a system information parameter associated with the network device that is cryptographically signed with the private key. The system information parameter(s) signed can be, for example, a system frame number, a current time, a location, a cell ID, and so on. By signing this data, such cannot be modified without detection and must actually match the parameters associated with the network device.

At reference numeral 704, the network device can transmit the system information block comprising the system information parameter and the signed parameter data. In other words, signed nonce data can be transmitted in the MIB as detailed at reference numeral 606 and signed parameter data can be transmitted in a SIB of the broadcast message.

At reference numeral 706, the network device can receive, from a user equipment device, a request to attach to the network device in response to the user equipment device using a public key associated with a communication provider entity to authenticate the broadcast message data. Such authentication can involve authenticating the signed nonce data and/or the signed parameter data.

Example Operating Environments

Figure 8:
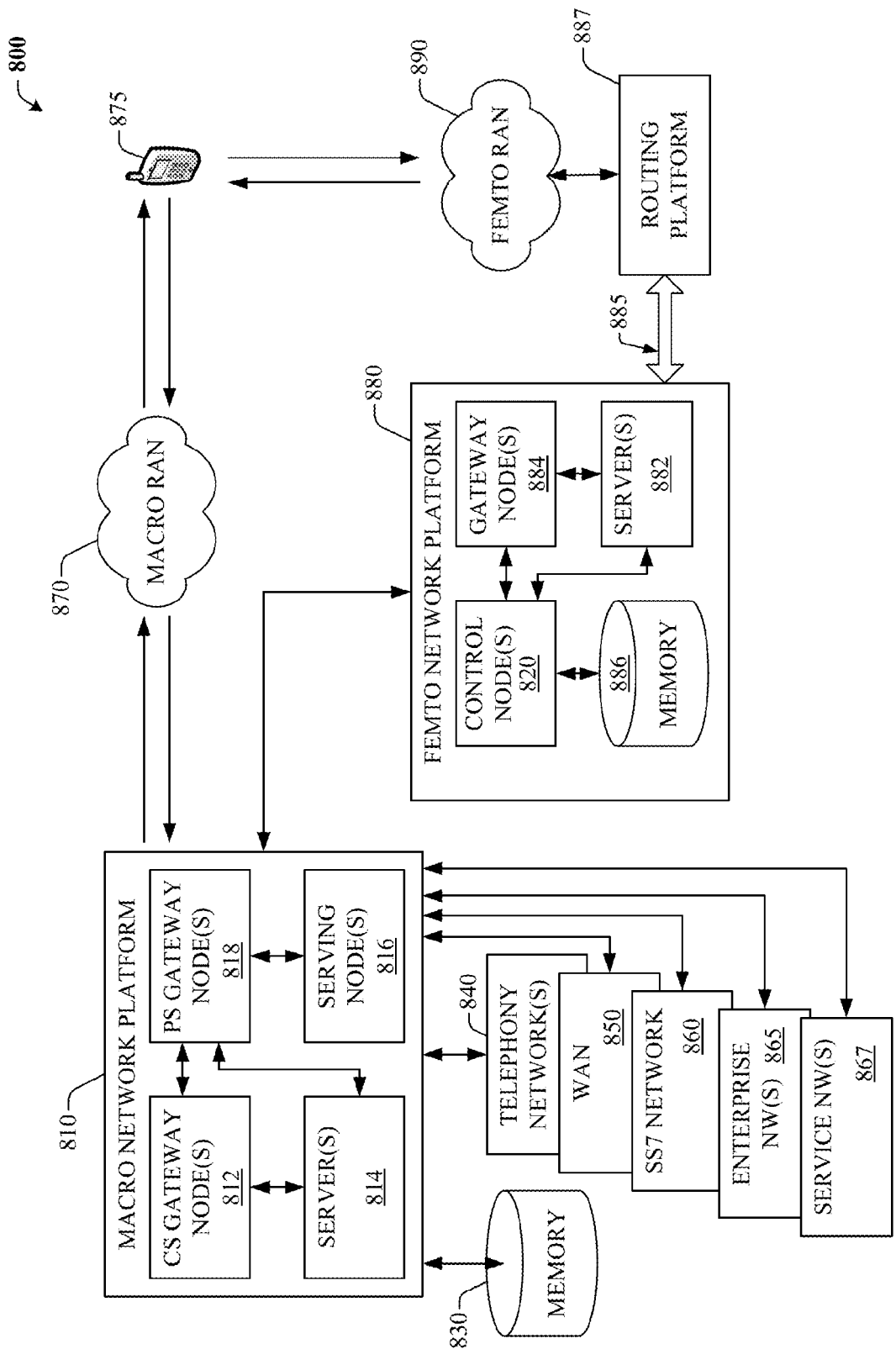
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication) with user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 810 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 870 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
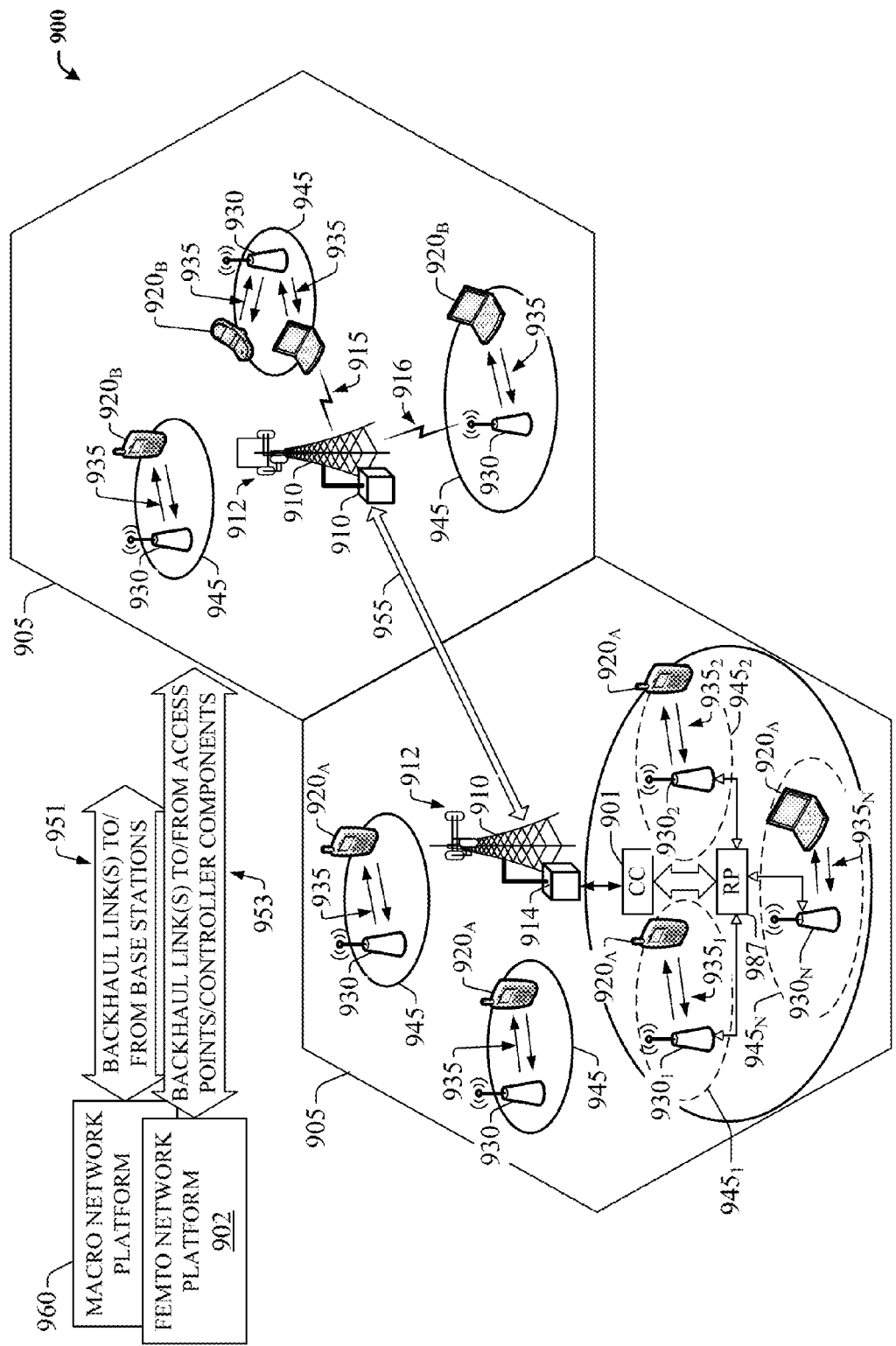
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE $920_A$, $920_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE $920_A$, $920_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs $920_A$ can be routed by the RP 987, for example, internally, to another UE $920_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points $930_1$-$930_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE $920_A$ connected to femto APs $930_1$-$930_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas $912_1$-$912_N$. It should be appreciated that while antennas $912_1$-$912_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
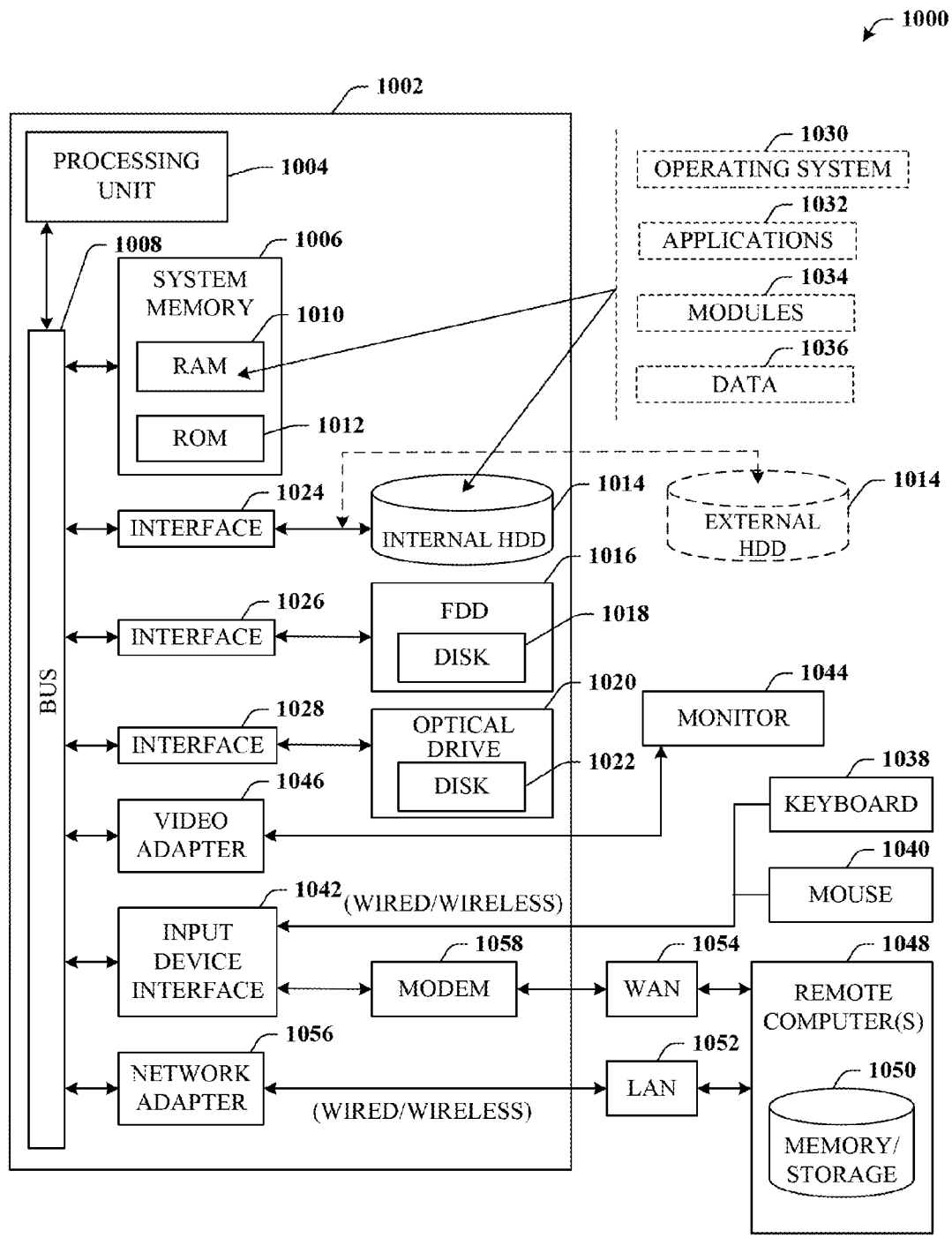
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various aspects of the disclosed subject matter, FIG. 10 and the following discussion are intended to provide a brief, general description of a suitable computing environment 1000 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 10, the exemplary environment 1000 for implementing various aspects of the disclosed subject matter comprises a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also comprise a high-speed RAM such as static RAM for caching data.

The computer 1002 further comprises an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the disclosed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may comprise a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically comprises other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also comprise a wireless access point disposed thereon for communicating with the wireless adapter 1056.

When used in a WAN networking environment, the computer 1002 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. An access point device, comprising:
a processor; and
a memory that stores executable instructions that, when executed by the processor, facilitate performance of operations, comprising:
generating nonce data representing cryptographic information that is randomly generated;
generating signed nonce data representing the nonce data that is cryptographically signed with a cryptographic key associated with a communication provider entity, wherein the signed nonce data authenticates the nonce data was generated by a device of the communication provider entity; and
transmitting broadcast message data comprising a public land mobile network code associated with the communication provider entity, the nonce data, and the signed nonce data.

2. The access point device of claim 1, wherein the operations further comprise generating signed parameter data representing a system information parameter associated with the access point device that is cryptographically signed with the cryptographic key, wherein the system information parameter is a portion of the broadcast message data.

3. The access point device of claim 2, wherein the broadcast message data comprises a master information block and a system information block.

4. The access point device of claim 3, wherein the master information block comprises the signed nonce data and the system information block comprise the signed parameter data.

5. The device of claim 2, wherein the parameter is frame number data that indicates a number of a time frame used in communication between the access point device and a user equipment device.

6. The device of claim 2, wherein the system information parameter is cell ID data representing an identity of the access point device.

7. The device of claim 2, wherein the system information parameter is location data representing a location area identifier of the access point device.

8. The device of claim 2, wherein the system information parameter is time stamp data representing a time at which the broadcast message data is transmitted by the access point device.

9. A user equipment device, comprising:
a processor; and
a memory that stores executable instructions that, when executed by the processor, facilitate performance of operations, comprising:
receiving, from an access point device, broadcast message data comprising a public land mobile network code of a communication provider entity, nonce data, and signed nonce data, wherein the nonce data represents cryptographic information that is randomly generated and the signed nonce data represents the nonce data that is signed with a first key associated with the communication provider entity;
authenticating the broadcast message using a second key associated with the communication provider entity;
in response to a first determination that the broadcast message data was authenticated, transmitting to the access point device request data representing a request to attach to the access point device; and
in response to a second determination that the broadcast message data was not authenticated, preventing transmission of requests to attach to the access point device.

10. The user equipment device of claim 9, wherein the authenticating the broadcast message comprises authenticating the signed nonce data.

11. The user equipment device of claim 9, wherein the broadcast message further comprises a system information parameter associated with the access point device that is transmitted as part of a master information block or a system information block.

12. The user equipment device of claim 11, wherein the system information parameter is one of a system frame number, a time stamp, a location identifier, or a cell identifier.

13. The user equipment device of claim 11, wherein the broadcast message further comprises signed parameter data representing the system information parameter that is cryptographically signed with the first key.

14. The user equipment device of claim 13, wherein the authenticating the broadcast message comprises authenticating the signed nonce data and authenticating the signed parameter data.

15. The user equipment device of claim 14, wherein the authenticating the signed parameter data comprises using the second key to generate other signed data representing a cryptographic signature applied to the system information parameters and comparing the other signed data to the signed parameter data.

16. The user equipment device of claim 14, wherein the authenticating the signed parameter data comprises generating hash data representing a hash function applied to the system information parameters and comparing the hash data to the signed parameter data.

17. A method, comprising:
   generating, by a network device comprising a processor, nonce data representing cryptographic information that is randomly generated;
   generating, by the network device, signed nonce data representing the nonce data that is cryptographically signed with a private key associated with a communication provider entity, wherein the signed nonce data authenticates the nonce data is from the network device of the communication provider entity; and
   transmitting, by the network device, broadcast message data comprising a master information block that comprises the signed nonce data and a system information block that comprises a public land mobile network code associated with the communication provider entity.

18. The method of claim 17, further comprising generating, by the network device, signed parameter data representing a system information parameter associated with the network device that is cryptographically signed with the private key.

19. The method of claim 17, wherein the transmitting the broadcast message data comprises transmitting, by the network device, the system information block comprising the system information parameter and the signed parameter data.

20. The method of claim 17, further comprising receiving, by the network device and from a user equipment device, a request to attach to the network device in response to the user equipment device using a public key associated with a communication provider entity to authenticate the broadcast message data.

* * * * *